J. INGELS.
PEDAL PIN.
APPLICATION FILED OCT. 23, 1920.
1,375,003. Patented Apr. 19, 1921.
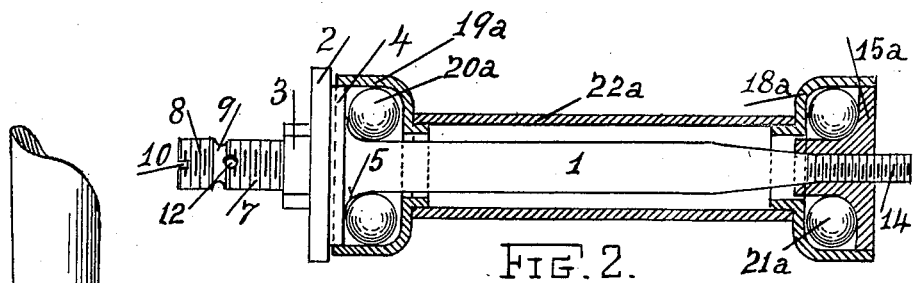
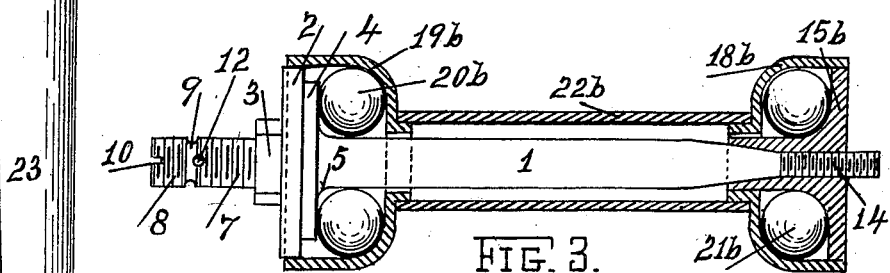
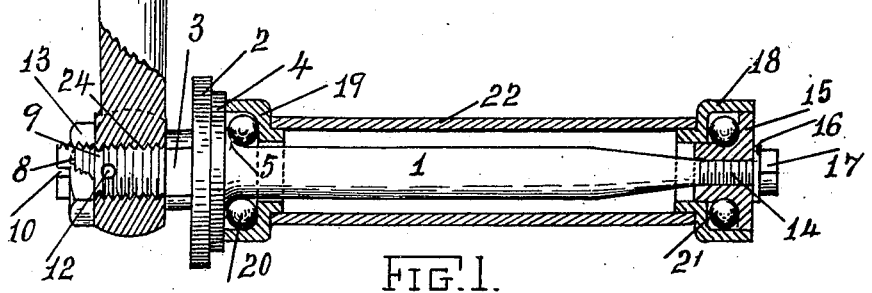
Witnesses.
A. D. Du Bois.
C. D. Du Bois.
Inventor.
JAMES INGELS
by Atty N. Du Bois.

UNITED STATES PATENT OFFICE.

JAMES INGELS, OF SPRINGFIELD, ILLINOIS.

PEDAL-PIN.

1,375,003.	Specification of Letters Patent.	Patented Apr. 19, 1921.

Application filed October 23, 1920. Serial No. 419,117.

*To all whom it may concern:*

Be it known that I, JAMES INGELS, a citizen of the United States, residing at Springfield, in the county of Sangamon and State of Illinois, have invented a new and useful Pedal-Pin, of which the following is a specification.

The invention relates to pedal pins for bicycles and is primarily designed for use in repairing bicycles the pedal pins of which have been broken; or the crank arms of which have been split or stripped of their screw threads.

It is well known to persons doing repair work that the falling of bicycles and the striking of their pedal pins against pavement or other hard object often causes the breaking of the pedal pins, or the stripping of the internal screw threads of the crank arm; and in some instances results in splitting the lower end of the crank arm.

Standard crank pins for repair work are separate articles of manufacture, commonly carried in stock by repair men, and may be used in case the threads are not stripped from the crank arm; but in case the internal screw threads are stripped from the crank arm new threads cannot be cut because the metal of the arm is too thin and too hard, hence a few shops, having the necessary facilities, have resorted to the expedient of pressing an internally screw threaded bushing into the hole in the crank arm and then screwing the pedal pin into the bushing; but many repair men have neither the skill nor the facilities to repair in that manner and so will not repair the old crank, but will put on a new crank arm and pin at the needless cost of the owner. Furthermore, the repair pedal pins hitherto used have not been adapted for use with various sizes of ball bearings.

I have found by experiment that although pedal pins have been approximately standardized the ball bearing cones, cups and housings have not been standardized; hence it is often necessary to reshape the cups to conform to the repair pedal pins, or else to change the pedal pins to conform to the cup. In either case, only skilled mechanics can do the work. Hence the repair is excessively costly in either case.

To avoid the use of bushings, to avoid unnecessary and costly work in fitting the cups to the pedal pin and to avoid discarding serviceable crank arms, I have devised and used the improved pedal-repair pin shown in the drawing and now to be described and finally recited in the claims.

Figure 1 is a side elevation of a pedal pin embodying my invention, in conjunction with a bicycle crank arm, a ball cone, ball cups, a pedal tube extending between the ball cups, and balls in the ball cup; some of the parts being shown in sections. For convenience in description the ball bearings shown in this view are called small ball bearings. Fig. 2 is a side elevation of the same pedal pin in conjunction with medium sized ball bearings, shown in section; and Fig. 3 is a side elevation of the same pedal pin in conjunction with large sized ball bearings, shown in sections.

The same reference numerals designate the same parts in all the views.

The one-piece pedal pin is made of steel and comprises a cylindrical body 1; a cylindrical shoulder member 2 having a circular periphery conformed to the inner surface of relatively large ball cups and a flat surface adapted to be engaged by the outer rim of medium ball cups; a shoulder member 3 having opposite flat sides to receive a wrench for holding, or rotating the pin, as the case may be; an offset member 4 having a circular periphery conformed to the inner circumference of medium ball cups and a flat surface adapted to be engaged by the outer rim of small ball cups; a concave ball cone 5 on which the balls 20 roll; a main screw 7, engaging in the internal screw threads 24 of the pedal crank arm 23; an extension screw member 8; a circumferential groove 9 at the juncture of the screw members 7 and 8; a slot 10 in the end of the screw 8 to receive the screw driver to rotate the pedal pin; a hole 12 transverse to the screw 7 and cutting into the groove 9; a nut 13 on the screw 8; and a reduced screw member 14 at the outer end of the pedal pin. Here it is to be noted that, in use, the periphery of the member 2 co-acts with the inner surface of relatively large ball cups and its flat surface co-acts with the outer rim of medium ball cups; and the periphery of the member 4 co-acts with the inner surface of medium ball cups and its flat surface co-acts with the outer rim of small ball cups.

A ball cone 15 screws on the screw 14. A washer 16 contacts with the face of the ball cone 15 and a nut 17 on the screw 14 secures the ball cone on the pedal pin.

A ball cup 18 surrounds the cone 15. A ball cup 19 surrounds the body 1 and contacts with the face of the member 4. Balls 20 in the cup 19 and balls 21 in the cup 18 minimize friction between the moving parts. A tube 22 extends between and is supported on the ball cups 18 and 19.

In case the screw threads 24 of the arm 23 are stripped, so that the screw 7 will not take on the threads the member 7 will be inserted in the hole in the crank arm and the nut 13 will be screwed onto the screw 8 to securely connect the parts. If the threads 24 are serviceable the screw end 8 will be cut off by a tool running in the groove 9 and the fin remaining adjacent to the hole 12 will be filed away to form the hole into a notch to receive a screw driver, so that in case the screw 7 becomes broken, a screw driver may be used to remove it from the crank arm.

In Figs. 2 and 3 ball bearings of different sizes are shown but the pedal pin proper is adapted for use with ball bearings of either size, as will now be described.

The medium sized ball cone $15^a$ engages on the screw 14. The cup $18^a$ surrounds the cone $15^a$. The ball cup $19^a$ surrounds the offset member 4. Balls $20^a$ travel in the cup $19^a$ and balls $21^a$ travel in the cup $18^a$. The tube $22^a$ extends between the cups $18^a$ and $19^a$.

If larger sized ball bearings are to be used, the cone $15^b$ will engage on the screw 14. The cup $18^b$ will surround the cone $15^b$; the cup $19^b$ will surround the shoulder member 2; the balls $20^b$ will travel in the cup $19^b$; the balls $21^b$ will travel in the cup $15^b$; and the tube $22^b$ will extend between the cups $18^b$ and $19^b$.

Having fully described my invention, what I claim as new and desire to secure by Letters Patent is:

1. A pedal pin comprising a cylindrical body having at its crank end a ball cone; a shoulder member having a circular periphery conformed to the inner surface of relatively large ball cups and a flat face adapted to co-act with the outer rim of medium ball cups; a set off member having a circular periphery conformed to the inner surface of medium ball cups, and a flat surface adapted to co-act with the outer rim of small ball cups; a member having flat opposite sides to receive a wrench; an inner and an outer screw member; a groove between said screw members; and a reduced screw at the free end of the body.

2. A repair pedal pin comprising a tapered body member; a ball cone; a circular shoulder member; a member having parallel flat-sides to receive a wrench; a main screw member; a screw extension; a groove at the juncture of the main screw member and the extension and serving as a guide for cutting off the screw; and a hole transverse to the main screw member and adapted to serve as a notch for a screw driver.

In witness whereof I have hereunto signed my name at Springfield, Illinois, this 2d day of October, 1920.

JAMES INGELS.

Witnesses:
S. H. TROXELL,
ROY G. TROXELL.